US008383784B2

(12) United States Patent
Park et al.

(10) Patent No.: US 8,383,784 B2
(45) Date of Patent: *Feb. 26, 2013

(54) LIGNOTHERMOPLASTIC

(75) Inventors: David W. Park, Puyallup, WA (US); Amar N. Neogi, Kenmore, WA (US); Ludwig Furtner, Jr., Tacoma, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 354 days.

This patent is subject to a terminal disclaimer.

(21) Appl. No.: 12/551,388

(22) Filed: Aug. 31, 2009

(65) Prior Publication Data

US 2011/0054154 A1 Mar. 3, 2011

(51) Int. Cl.
*C07G 1/00* (2011.01)
*C08H 7/00* (2011.01)
*C08L 97/00* (2006.01)

(52) U.S. Cl. ......................... 530/507; 530/500

(58) Field of Classification Search ................. 530/500, 530/507

See application file for complete search history.

(56) References Cited

U.S. PATENT DOCUMENTS

| 3,355,400 | A | | 11/1967 | Smith | |
|---|---|---|---|---|---|
| 4,803,255 | A | * | 2/1989 | Pruett et al. | 527/400 |
| 5,512,276 | A | * | 4/1996 | Lang et al. | 424/70.11 |
| 5,750,201 | A | * | 5/1998 | Phanopoulos et al. | 427/375 |
| 5,773,590 | A | * | 6/1998 | Hart | 530/500 |
| 5,834,529 | A | * | 11/1998 | Reese et al. | 521/159 |
| 6,025,452 | A | | 2/2000 | Kurple | |
| 6,054,562 | A | | 4/2000 | Kurple | |
| 6,084,003 | A | | 7/2000 | Kurple | |
| 6,284,838 | B1 | | 9/2001 | Silbiger | |
| 6,509,397 | B1 | | 1/2003 | Nagele | |
| 6,706,106 | B1 | | 3/2004 | Nagele | |
| 2008/0196847 | A1 | * | 8/2008 | Pieter van Heiningen et al. | 162/9 |
| 2010/0311876 | A1 | * | 12/2010 | Fish et al. | 524/73 |
| 2011/0047865 | A1 | * | 3/2011 | Park et al. | 44/535 |

FOREIGN PATENT DOCUMENTS

GB 476344 6/1935

OTHER PUBLICATIONS

Wang et al. Prog. Polym. Sci. vol. 17, 611-646, 1992.*
Chanda et al., Polymer Technology Handbook, Fourth Edition, 2006, Chapter 1, 1-104-1-111.*
Aziz, S. and McDonough, T.J., Solvent Pulping—dissolution or Disillusion? IPC Technical Paper Series No. 182, The Institute of Paper Chemistry, Appleton, WI, Jun. 1986.
Stephenson, J. Newell, Preparation & Treatment of Wood Pulp, vol. 1, Pulp and Paper Manufacture, pp. 72-73 McGraw-Hill Book Company, New York, 1950.
Casey, James P., Pulp and Bleaching, vol. I, Pulp and Paper Chemistry and Chemical Technology, Second Edition, Interscience Publishers, Inc., New York, 1952.

\* cited by examiner

*Primary Examiner* — Liam Heincer
(74) *Attorney, Agent, or Firm* — John M. Crawford

(57) ABSTRACT

A thermoplastic material made from lignin, polyol and a melting point reducer where the melting point reducer is miscible in the specific polyol employed and where the lignin, polyol and melting point reducer are all miscible when in their melted state.

2 Claims, No Drawings

LIGNOTHERMOPLASTIC

TECHNICAL FIELD

The present application generally relates to a thermoplastic material made from lignin, polyol and a melting point reducer where the melting point reducer is miscible in the specific polyol employed and where the lignin, polyol and melting point reducer are all miscible when in their melted state.

BACKGROUND

Thermoplastic materials are well known in the art. They are used in many applications, especially in forming articles that require shaping carried out under high temperatures and pressures. The processing of the thermoplastic materials generally involves injection molding, extruding, calendering or rolling. Because of the temperature at which these processes typically operate under, thermal degradation of the thermoplastic polymer is a significant concern.

Lignin is a naturally occurring polymer that exhibits no measureable melting point, but rather upon exposure to elevated temperatures of greater than 120° C. undergoes thermal decomposition. For that reason, its application as a thermoplastic material has been significantly limited with its most commercial use found in asphalt.

With significant cost pressures on petroleum-based thermoplastics and an increasing public demand for its substitution with non-petrochemical based materials that are renewable there is a increasing need for lignothermoplastic materials in the marketplace.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the embodiments described herein relate to a thermoplastic material made from lignin, polyol and a melting point reducer where the melting point reducer is miscible in the specific polyol employed and where the lignin, polyol and melting point reducer are all miscible when in their melted state.

Another aspect of the embodiments described herein relates to a thermoplastic material made from lignin, polyethylene glycol and tall or soybean oil.

DETAILED DESCRIPTION

Thermoplastic materials in accordance with the present invention may be made from a broad range of lignins. Lignin is found in the cell walls of vascular plants and in the woody stems of hardwoods and softwoods. Along with cellulose and hemicellulose, lignin forms the major components of the cell wall of these vascular plants and woods. Lignin acts as a matrix material that binds the plant polysaccharides, microfibrils, and fibers, thereby imparting strength and rigidity to the plant stem. Total lignin content can vary from plant to plant. For example, in hardwoods and softwoods, lignin content can range from about 15% to about 40%. Wood pulping is one process for recovering lignin and is one of the largest industries in the world. Various types of wood pulping processes exist, including Kraft pulping, sulfite pulping, soda pulping, and organosolv pulping. Each of these processes results in large amounts of lignin being extracted from the wood. The extracted lignin has generally been considered to be waste and traditionally was either burned to recover energy or otherwise disposed of. Only a small amount of lignin is recovered and processed to make other products. Efforts are now underway to utilize this lignin, motivated by its widespread availability and the renewable nature of its source. In addition, the biodegradability of lignin makes it attractive from a "green" perspective. In addition to the lignin derived from hardwood and softwood trees lignin can also be derived from energy crops (such as switchgrass, miscanthum, prairie cordgrass, and native reed canary grass to name but a few) and agriculture waste (such as corn stover, corn residue, corn husk, sugar cane bagasse, castor oil plant, rapeseed plant, soybean plant, cereal straw, grain processing by-products, bamboo, bamboo pulp, bamboo sawdust, rice straw, paper sludge, waste papers, recycled papers, and recycled pulp to name but a few).

The lignin is often obtained in the form of a light to dark brown or reddish mass which may be granulated upon drying. To be useful in the present invention the lignin composition must have a low melting point when in the dry state, correlated to the conditions to which it will be subjected to as part of the thermoplastic operations. Lignin readily obtainable from hardwood or softwood pulping operations has been found to exhibit no measureable melting point, but rather upon exposure to elevated temperatures of greater than 120° C. undergoes thermal decomposition. By low melting point what is meant is a temperature that enables the lignin-containing material to be used in current thermoplastic processing conditions, typically at or below 85° C.

In accordance with the present invention it has now been found that the addition of a polyol and a melting point reducer where the melting point reducer is miscible in the specific polyol employed and where the lignin, polyol and melting point reducer are all miscible when in their melted state prevents the lignin from undergoing thermal decomposition and provides a thermoplastic material with an attractive melting point.

Suitable polyols include, but are not necessarily limited to, polyethylene glycol, polypropylene glycol, polyethylene oxide, 1,3-propanediol, polyethylene-polypropylene glycol copolymers and polyether polyol. Preferably, the polyol is polyethylene glycol.

Suitable melting point reducers include, but are not necessarily limited to, tall oil, soybean oil, paraffin wax, vegetable wax such as those derived from soy beans. Preferably, the melting point reducer is tall oil or soybean oil.

The thermoplastic material of the present invention comprises from about 50 to 85 weight percent of lignin; and from about 10 to 50 weight percent of the polyol and from about 2 to 15 weight percent of the melting point reducer. Preferably, the thermoplastic material of the present invention comprises from about 75 to 85 weight percent of lignin; and from about 10 to 25 weight percent of the polyol and from about 5 to 10 weight percent of the melting point reducer.

In one aspect of the invention is has been observed that when the polyol is 1,3-propanediol the addition of the melting point reducer is not required and therefore the amount is from about 50 to 85 weight percent of lignin; and from about 15 to 50 weight percent of a 1,3-propanediol; preferably, from about 75 to 85 weight percent of lignin; and from about 15 to 25 weight percent of a 1,3-propanediol The thermoplastic material itself is made by first mixing and then heating a blend of lignin, the polyol and melting point reducer. The lignin material is used in a ground or powdered form, preferably no more than 250 microns in average particle size. All three components can be combined at once or the polyol and melting point reducer can be precombined prior to the addition of the lignin. Hot blending is typically done in conventional blending equipment at an elevated temperature, such as 100° C., until a homogeneous blend is obtained.

The thermoplastic materials made in accordance with this invention find utility in any number of applications including, but not limited to, asphalt for roads and roofs, insulation facing, hot melt adhesives, binders for cellulosic materials such as firelogs and injection molded or extruded materials.

Whereas the exact scope of the instant invention is set forth in the claims, the following specific examples illustrate certain aspects of the present invention and, more particularly, point out methods of evaluating the same. However, the examples are set forth for illustration only and are not to be construed as limitations on the present invention except as set forth in the claims. All parts and percentages are by weight unless otherwise specified.

EXAMPLES

1. Differential Scanning Calorimeter (DSC) Analysis

Description of instrument and analysis: Glass transitions were measured on a TA Instrument Q200 Differential Scanning Calorimeter (DSC) using Aluminum Tzero Hermetic Pans. The method involved cooling the samples at 10° C./min from room temperature to −75° C., heating at 20° C./min to 160° C., cooling at 10° C./min to −75° C., and a final heat at 20° C./min to 170° C. The first glass transition was considered of most importance but glass transitions were also observed in the final heat cycle.

Sample preparation: 10-gram samples were prepared by weighing out 2.5 grams of modifying agent and 7.5 grams of a softwood kraft lignin from Backhammar ("SWKL") in aluminum weigh boats. The samples are next placed on a hot plate, and gradually heated, while mixing the samples. At the point of a phase change in two or more of the mixed materials into a uniform, viscous liquid occurs, the temperature is noted and the samples are mixed until homogeneous. The modifying agents evaluated were:

1. Polyethylene oxide (PEO) N-10 (200,000 mw) Union Carbide
2. Polyethylene glycol (PEG) 200, 4,000mw Dow
3. PEG 35,000, Clariant
4. Polypropylene glycols (PPG) 425, 2,000 mw, Dow
5. Paraffin wax
6. 1,3 Propanediol, derived from corn from Interstate Chemical
7. Ethylene Glycol, Aldrich
8. Diethylene Glycol (DEG), Aldrich
9. Soy Bean Wax, Marcus Oil & Chemical
10. Tall Oil, Arizona Chemical Sample testing: The samples, typically received in plastic zip-lock bags, are friable black solids. 10 to 15 milligram subsamples will be weighed into hermetically sealable Tzero aluminum pans. The instrument available is the TA Instruments DSC Q200. The temperature program will run from −75° C. to a maximum of 165° C. The DSC sample cell will be purged with pre-pure nitrogen during the run. The first heating curve will be inspected for potential transitions, including melting and glass transitions.

DSC Results: Several sample combinations were evaluated. Typically, three specimens were measured per experiment. Table 1 represents an average value of the results obtained.

TABLE 1

DSC Test Results

| Formula | Melting Point | Observations |
|---|---|---|
| 75% SWKL/25% PEG 200 | 162° C. | Evidence of decomposition at 159° C. |
| 75% SWKL/25% PEG 200 with 10% Tall Oil | 70.59° C. | Substantial reduction from 162° C. |
| 75% SWKL/25% PEG 200 with 10% paraffin wax | 53.53° C. | Substantial reduction from 162° C. |
| 75% SWKL/25% Glycerin | 122° C. | Evidence of smoke during sample preparation |
| 75% SWKL/25% Glycerin with 10% Tall Oil | 132° C. | No improvement with Tall Oil additive |
| 75% SWKL/25% PDO | 47.66° C. | No smoke or decomposition |
| 85% SWKL/15% PDO | 52.23° C. | No smoke or decomposition |

TABLE 2

DSC Test Results

| Formula | Melting Point | Observations |
|---|---|---|
| 75% SWKL/25% Ethylene Glycol | 73.66° C. | No smoke or decomposition |
| 75% SWKL/25% DEG | 69.31° C. | No smoke or decomposition |
| 75% SWKL/25% PPG 425 | 107.57° C. | No smoke or decomposition |
| 75% SWKL/25% PPG 2000 | 118.93° C. | No smoke or decomposition |
| 75% SWKL/25% PEG 4000 | 130.74° C. | No smoke or decomposition |
| 75% SWKL/25% PDO | 47.66° C. | No smoke or decomposition |
| 85% SWKL/15% PEO | +150° C. | Evidence of smoke during sample preparation |

Although the use of some polyols may result in a thermoplastic material that has a low melting point, most polyols do not generate a sufficiently low melting point and thus the need for the third component.

While illustrative embodiments have been illustrated and described, it will be appreciated that various changes can be made therein without departing from the spirit and scope of the claimed subject matter.

The embodiments of the subject matter in which an exclusive property or privilege is claimed are defined as follows:

1. A thermoplastic material comprising a mixture of (a) from about 50 to 85 weight percent of lignin; and (b) from about 15 to 50 weight percent of a 1,3-propanediol.

2. The thermoplastic material of claim 1, wherein the lignin is present in an amount from about 75 to 85 weight percent and the 1,3-propanediol is present in an amount from about 15 to 25 weight percent.

* * * * *